United States Patent
Canada et al.

(10) Patent No.: US 12,242,616 B2
(45) Date of Patent: *Mar. 4, 2025

(54) METHOD AND SYSTEM FOR SOFTWARE SECURITY VULNERABILITY DIAGNOSTIC ASSESSMENT

(71) Applicant: VENTECH SOLUTIONS, INC., Columbus, OH (US)

(72) Inventors: Matthew Canada, Rosedale, MD (US); Jerry Allen Craig, II, Knoxville, TN (US); Kathrine Dass, Severna Park, MD (US); Raja Krishnamurthy, Lewis Center, OH (US); David Anthony Rigsby, Heath, OH (US); Richard Nathan Toney, Windsor Mill, MD (US); Stephen J. Veneruso, Columbus, OH (US)

(73) Assignee: Ventech Solutions, Inc., Columbus, OH (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/985,717

(22) Filed: Nov. 11, 2022

(65) Prior Publication Data
US 2023/0141869 A1 May 11, 2023

Related U.S. Application Data

(63) Continuation of application No. 16/449,008, filed on Jun. 21, 2019, now Pat. No. 11,640,469.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | |
|---|---|---|
| 7,284,274 B1 | 10/2007 | Wells |
| 7,552,480 B1 | 6/2009 | Voss |
| 7,950,057 B1 | 5/2011 | Kennedy |
| 8,806,647 B1 | 8/2014 | Daswani |
| 9,497,136 B1 | 11/2016 | Ramarao |
| 10,313,211 B1 * | 6/2019 | Rastogi ............... H04L 41/142 |
| 10,868,825 B1 | 12/2020 | Dominessy |
| 10,915,638 B2 | 2/2021 | Czaplewski |
| 2004/0221176 A1 | 11/2004 | Cole |
| 2006/0005137 A1 | 1/2006 | Jolley |
| 2008/0033989 A1 | 2/2008 | Oh |

(Continued)

*Primary Examiner* — Fatoumata Traore
(74) *Attorney, Agent, or Firm* — Mahamedi IP Law LLP

(57) ABSTRACT

A method and system of selecting a software testing regimen for a software application. The method comprises receiving, at a security assessing server computing device, a Quality of Service (QoS) performance level in conjunction with a set of technical attributes of the software application, determining a security vulnerability diagnostic score for the software application based at least in part on the set of technical attributes and the QoS performance level, and selecting the software testing regimen in accordance with the QoS performance level and the security vulnerability diagnostic score.

19 Claims, 3 Drawing Sheets

(56) References Cited

U.S. PATENT DOCUMENTS

| | | |
|---|---|---|
| 2008/0209567 A1* | 8/2008 | Lockhart ............ G06F 11/3612 726/25 |
| 2011/0145920 A1 | 6/2011 | Mahaffey |
| 2011/0173693 A1 | 7/2011 | Wysopal |
| 2012/0096558 A1 | 4/2012 | Evrard |
| 2012/0110174 A1 | 5/2012 | Wootton |
| 2012/0216243 A1 | 8/2012 | Gill |
| 2013/0227695 A1 | 8/2013 | Shankar |
| 2013/0232472 A1 | 9/2013 | Korner |
| 2013/0283336 A1 | 10/2013 | Macy |
| 2013/0290322 A1 | 10/2013 | Prosnitz |
| 2015/0066575 A1 | 3/2015 | Baikalov |
| 2015/0089385 A1 | 3/2015 | Radhakrishnan |
| 2015/0248559 A1 | 9/2015 | Madou |
| 2016/0099953 A1 | 4/2016 | Mahaffey |
| 2016/0112445 A1 | 4/2016 | Abramowitz |
| 2017/0091078 A1* | 3/2017 | Atyam ................ G06F 11/3616 |
| 2017/0200006 A1* | 7/2017 | Gershoni ............... G06Q 50/10 |
| 2017/0213037 A1 | 7/2017 | Toledano |
| 2017/0220805 A1 | 8/2017 | Ng |
| 2017/0223043 A1 | 8/2017 | Munoz |
| 2017/0244748 A1 | 8/2017 | Krause |
| 2017/0255782 A1 | 9/2017 | Jayaraman |
| 2017/0329466 A1 | 11/2017 | Krenkler |
| 2018/0121659 A1* | 5/2018 | Sawhney ............. G06F 21/566 |
| 2018/0143891 A1* | 5/2018 | Polisetty ................ G06F 9/542 |
| 2018/0146004 A1 | 5/2018 | Belfiore, Jr. |
| 2018/0260572 A1 | 9/2018 | Bhattacharya |
| 2018/0288086 A1 | 10/2018 | Amiri |
| 2018/0307481 A1* | 10/2018 | Ganesan ............... G06F 16/254 |
| 2019/0095587 A1 | 3/2019 | Warner |
| 2019/0108740 A1 | 4/2019 | Coke |
| 2019/0109872 A1 | 4/2019 | Dhakshinamoorthy |
| 2019/0114573 A1 | 4/2019 | Moore |
| 2019/0289029 A1 | 9/2019 | Chawla |
| 2019/0311134 A1 | 10/2019 | Mahaffey |
| 2020/0057857 A1 | 2/2020 | Roytman |
| 2020/0120126 A1 | 4/2020 | Ocepek |
| 2020/0336507 A1 | 10/2020 | Lee |
| 2020/0401938 A1 | 12/2020 | Etkin |
| 2022/0201042 A1 | 6/2022 | Crabtree |

* cited by examiner

300

```
┌─────────────────────────────────────────────────┐
│ Receive a set of technical attributes of the    │
│ software application                            │
│                                                 │
│                                             310 │
└─────────────────────────────────────────────────┘
                         │
                         ▼
┌─────────────────────────────────────────────────┐
│ Receive a set of execution context attributes of the │
│ software application                            │
│                                                 │
│                                             320 │
└─────────────────────────────────────────────────┘
                         │
                         ▼
┌─────────────────────────────────────────────────┐
│ Determine a security vulnerability diagnostic score │
│ for the software application based at least in part │
│ on the set of technical attributes and the set of │
│ execution context attributes                330 │
└─────────────────────────────────────────────────┘
```

FIG. 3

METHOD AND SYSTEM FOR SOFTWARE SECURITY VULNERABILITY DIAGNOSTIC ASSESSMENT

CROSS-REFERENCE TO RELATED APPLICATIONS

This application is a continuation of U.S. patent application Ser. No. 16/449,008 filed on Jun. 21, 2019; the aforementioned priority application being hereby incorporated by reference in its entirety herein.

TECHNICAL FIELD

The disclosure herein relates to software security diagnosis and assessment of software application products, including enterprise software application products.

BACKGROUND OF THE INVENTION

Protection of safety-critical software platform infrastructures and systems employed in healthcare, telecommunications, banking, and other commercial and industrial uses remains a major challenge. In particular, cyberattacks can be unpredictable, and intended to compromise or inhibit secure operation of an infrastructure or a critical component within the infrastructure. Computer viruses, trojans, hackers, cryptographic key recovery attacks, malicious executables and bots may present a constant threat to users of computers connected to public computer networks such as the Internet and also private networks such as corporate computer networks. In response to these threats, enterprise organizations may deploy antivirus software and firewalls. However, such preventative attempts may not always prove adequate.

For enterprise organizations deploying safety-critical software system infrastructure and components, it is important to ensure that their enterprise software applications and systems operate in a secure way and are robust and resilient with regard to cyberattacks performed via a data network. However, often the necessary software security assessment structure and solution may be missing or inadequate to assess current security aspects of a software system as deployed.

BRIEF DESCRIPTION OF DRAWINGS

FIG. 3 illustrates a method of operation, in an example embodiment, of a server computing system for security diagnostic assessment of enterprise software applications.

DETAILED DESCRIPTION

Figure 1:
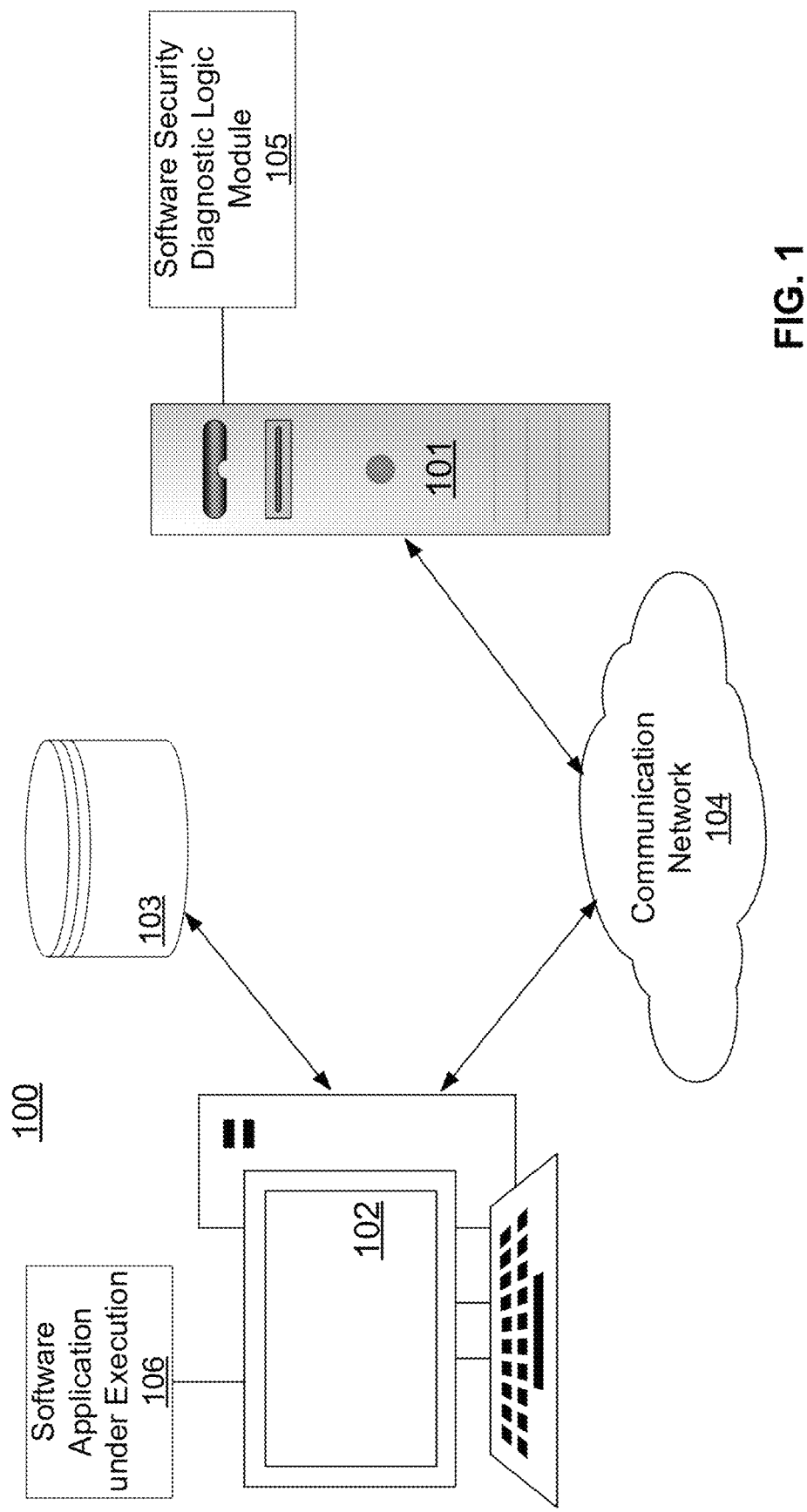
FIG. 1 illustrates, in an example embodiment, a cloud-based system for security diagnostic assessment of enterprise software applications.

Methods and systems provided herein advantageously enable a networked, cloud-based server device to assess and diagnose security aspects, including resilience and vulnerability attributes, of a software application, including enterprise software applications. As referred to herein, a software application includes application programs deployed on a customer premise, software as a service (SaaS), a cloud managed service provided application program, a mobile application, and any other computer readable instructions executable by a processor to implement desired functionality.

In particular, methods and systems herein assess a security vulnerability during development of the software application based on a plurality of scored descriptions pertaining to security risk attributes for the software application. Security vulnerability or risk can be diagnosed and scored or ranked by utilizing various inputs to quantify a risk associated with a particular aspect of a software product, such as a security risk associated with exploitation of a security vulnerability inherent to the software application. In this manner, assessing or scoring security risk associated with exploitation of a security vulnerability for a software application can contribute to more effectively managing and pre-empting security risks to an enterprise organization.

Furthermore, a security vulnerability diagnostic score as proposed herein may be used to determine whether and to what extent to trust an enterprise software system or similar infrastructure and software components. In other embodiments, the system can identify which of the various factors used in generating the security reliance score would have the most impact on the security vulnerability diagnostic score, thus assisting and directing administrators or others to evaluate and improve the impact of changes within an enterprise.

In related embodiments, a security vulnerability score or similar security assessment may be applied to, and associated with a particular software provider, or even an enterprise user, based on an expectation of performance in regard to vulnerability or resilience of software or related systems solutions provided or used. Such association may be determined or calculated at least in part based on a cumulative history of instances, or infrequency of occurrences, with regard to system vulnerabilities or system resilience associated with solutions used and/or provided by an enterprise entity or individual party. Usage factors implicated in the security assessment may include, but not necessarily limited to, any combination of the execution context attributes as described herein. Security assessment determinations for system providers may consider, but not necessarily limited to, any combination of technical attributes related to developing and deploying the software and system solutions as described herein.

In accordance with a first example embodiment, a method of performing a security vulnerability diagnostic assessment of an enterprise software application is provided. The method comprises receiving, at a security assessing server, a set of technical attributes of the software application; receiving a set of execution context attributes of the software application; and determining a security vulnerability diagnostic score for the software application based at least in part on the set of technical attributes and the set of execution context attributes. In general, a higher security vulnerability diagnostic score may be determined or assigned in instances where a given technical or execution context attribute contributes to, or indicates, a lower security risk or greater resilience to potential security threats. On the other hand, a lower score may be merited where assessment of the given attribute contributes to, or indicates, an increased security risk or a lessened resilience to potential software security threats.

In one embodiment, the security vulnerability diagnostic score comprises a weighted aggregation of a technical attribute security score based on the set of technical attributes and an execution context security score based on the set of execution context attributes.

In some examples, the set of technical attributes may include one or more of: a security history of constituent software development libraries used in developing the software application, a cryptographic attribute, and a system protocol attribute.

In some embodiments, the technical attribute security score may be determined based on: the constituent software development libraries used in developing the software application, the cryptographic attribute, and the system protocol attribute.

In some variations, the set of execution context attributes may be based on an assessment of the nature and extent of customer facing transactions, applicable quality of service (QoS) performance levels, and the type and extent of interlocking applications implicated in operational deployment of the software application.

An execution context security score, in certain embodiments, may be determined based on an assessment of any one or more of: the customer facing transactions, the QoS performance level and the interlocking applications implicated in operational deployment of the software application.

In certain aspects, the cryptographic attribute may pertain to a cryptographic key and a cryptographic certificate used in conjunction with a cryptographic algorithm.

In another aspect, the security history of constituent software development libraries used in developing the software application includes security vulnerability data accumulated based on industry-wide deployment of the constituent software development libraries.

Yet further, the system protocol attribute may relate to effectiveness of the cryptographic attribute as an indication of the vulnerability of systems and protocols applying attendant cryptographic material to account for known vulnerabilities of the cryptographic material when deployed in conjunction with particular systems and protocols.

In some practical uses of the methods and systems herein, results of the diagnostic assessment and scoring may be used to identify, select and recommend the most effective software testing regimen for the software application based on a given security vulnerability diagnostic score.

In accordance with a second example embodiment, a non-transitory medium storing instructions executable in a processor of a server computing device is provided. The instructions are executable to assess a security vulnerability diagnostic for a software application by: receiving, at a security assessing server, a set of technical attributes of the software application; receiving a set of execution context attributes of the software application; and determining a security vulnerability diagnostic score for the software application based at least in part on the set of technical attributes and the set of execution context attributes.

In accordance with a third example embodiment, a server computing system for deploying a software security diagnostic assessment is provided. The system comprises a server computing device that includes a memory storing instructions and one or more processors for executing the instructions stored thereon to: receive a set of technical attributes of the software application; receive a set of execution context attributes of the software application; and determine a security vulnerability diagnostic score for the software application based at least in part on the set of technical attributes and the set of execution context attributes.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory. A server computing device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, cloud-based system 100 for security diagnostic assessment of enterprise software applications. Server computing system or device 101 includes software security diagnostic logic module 105 embodied according to computer processor-executable instructions stored within a non-transitory memory. Server 101 is in communication via communication network 104 with computing device 102. Computing device 102, which may be a server computing device in some embodiments, may host enterprise software application 106 for execution thereon. Database 103, for example storing software development libraries pertaining to enterprise software application 106, is communicatively accessible to computing device 102.

Figure 2:
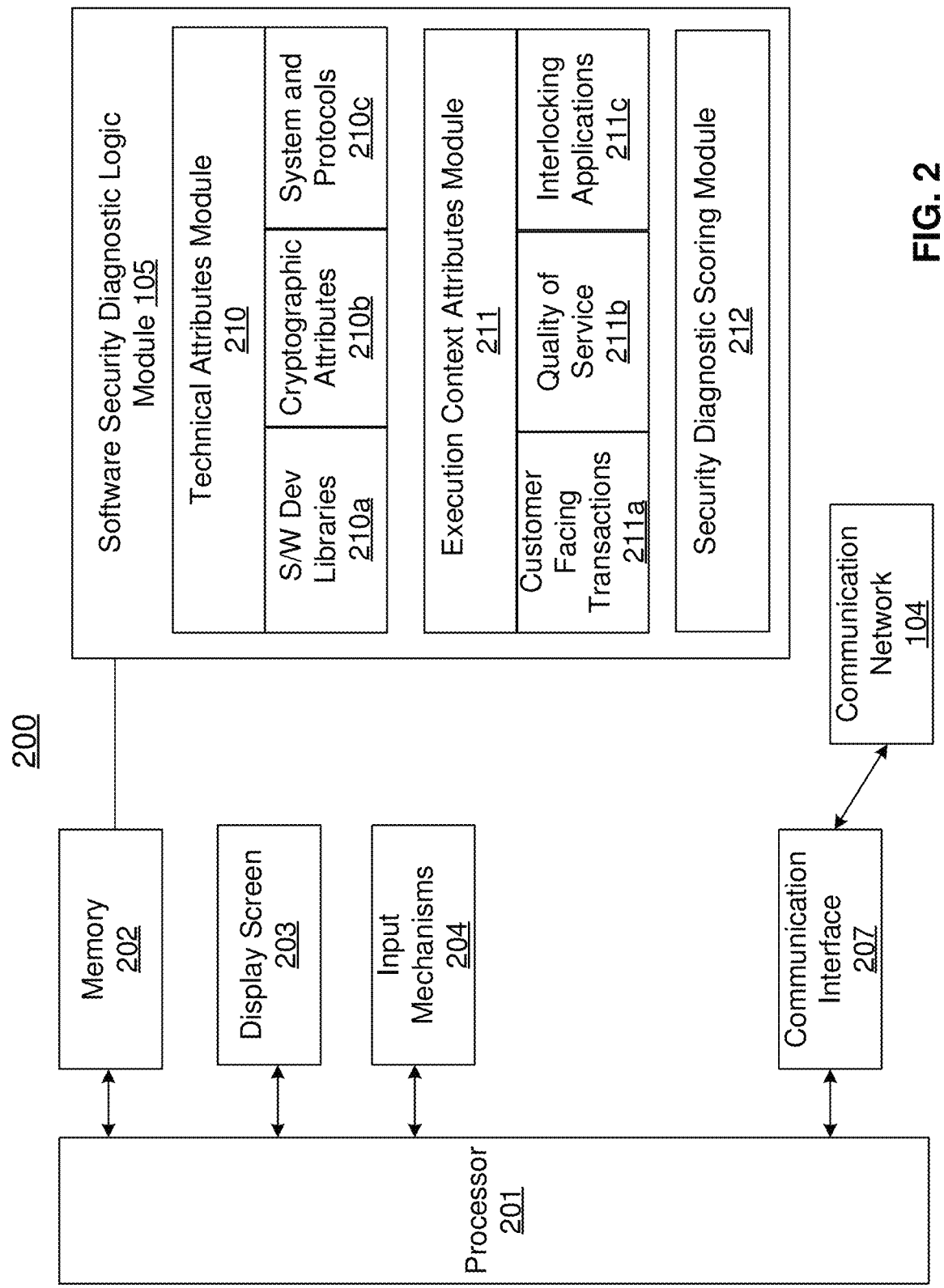
FIG. 2 illustrates, in one example embodiment, an architecture of a a cloud-based server computing system for security diagnostic assessment of enterprise software applications.

FIG. 2 illustrates, in an example embodiment, architecture 200 of server computing system 101 hosting software security diagnostic logic module 105 for security diagnostic assessment of enterprise software applications. Server computing system or device 101, also referred to herein as server 101, may include processor 201, memory 202, display screen 203, input mechanisms 204 such as a keyboard or software-implemented touchscreen input functionality, and communication interface 207 for communicating via communication network 104.

Software security diagnostic logic module 105 includes processor-executable instructions stored in memory 202 of server 101, the instructions configured to be executable in processor 201. Software security diagnostic logic module 105 may comprise portions or sub-modules including technical attributes module 210, execution context attributes module 211 and security diagnostic scoring module 212.

Processor 201 uses executable instructions of technical attributes module 210 to receive, in memory 202 of server computing device 101, a set of technical attributes of the software application.

Technical attributes module 210 provides, at least in part, functionality to derive a technical attributes score based on an aggregation of individual scores determined in accordance with, or assigned, to modules 210a, 210b and 210c.

The security history of constituent software development libraries used in developing the software application, in accordance with module 210a may be based on, and include, security vulnerability data accumulated based on industry-wide deployment of particular constituent modules of the software development libraries.

A notification service deployed at server 101 may be used to retrieve a copy of the software application deployed at computing device 102, or communicatively accessible to computing device 102 via database 103, over cloud-based communication network 104, and determine the software development libraries or components used in development of the software application. Software security diagnostic logic module 105 at server device 101 can then determine security vulnerabilities in the libraries, based on industry-wide accumulated experience in some embodiments, and provide a security assessment or assign a security score based on expected inherent vulnerabilities of the software application.

The cryptographic attribute 210b, in some embodiments, may pertain to a cryptographic key and a cryptographic certificate used with a cryptographic algorithm that may be inherent to, or accessed and applied, by the software application when deployed for production or normal uses as intended when under execution in a processor of computing device 102.

Particular aspects or attributes of the cryptographic material considered may include public key length, public key algorithm, the validity duration of the cryptographic certificate, the signature algorithm associated with the certificate, the certificate revocation status repository references for authority information access, the configuration of certificate extension attributes such as key usage, extended key usage, the certificate's issuer security vetting process, the certificate issuer origin, compliance to standards, policies, and best practices, and geographic locations and boundaries, among others.

The system protocol attribute in accordance with module 210c pertains to effectiveness of the cryptographic material when used in conjunction with particular operating systems and protocols to account for, and address, any known security vulnerabilities. In certain embodiments, the cryptographic related scoring may be further dynamically adjusted to identify the trustworthiness of a particular system based on applicable system and security protocols implemented, and the usage of the cryptographic material in response to incoming data.

Processor 201 uses executable instructions stored in execution context attributes module 211 to receive a set of execution context attributes of the software application.

Execution context attributes module 211 provides, at least in part, functionality to derive an execution context attributes score based on an aggregation of individual scores determined or assigned to modules 211a, 211b and 211c.

The nature and extent of customer facing transactions 211a considered may relate to context in which the application operates. For example, an application that is deployed as "customer-facing" and intended to facilitate high-volume, secure transactions such as banking and ecommerce necessitates more rigorous testing and an enhanced level of security scrutiny to ensure that customer data is not compromised. Conversely, applications such as document-control systems or desktop applications that are implemented entirely within a same enterprise or organization, and operated behind secure firewalls, less stringent security considerations may be applied.

The QoS operational performance level 211b attribute may relate to a required or expected system availability (e.g., 99.99% uptime), expected throughputs or transaction volumes, and the types of users, internal users versus external customers, who will operate and use the software application.

Interlocking applications 211c may pertain to the operating system in which the application executes in relation to other software applications and operating systems with which the application interacts and interoperates during operation for its intended purpose.

Processor 201 uses executable instructions stored in security diagnostic scoring module 212 to determine a security vulnerability diagnostic score for the software application based at least in part on the set of technical attributes and the set of execution context attributes.

In some embodiments, the security vulnerability diagnostic score comprises a weighted aggregation of a technical attribute security score based on the set of technical attributes and an execution context security score based on the set of execution context attributes.

In embodiments, a higher security vulnerability diagnostic score may be determined or assigned in instances where the particular attribute contributes to, or indicates, a lower security risk or greater resilience to potential security threats. On the other hand, a lower score may be merited where assessment of a given attribute contributes to, or indicates, an increased security risk or a lessened resilience to potential software security threats.

In certain aspects, security vulnerability diagnostic scores as proposed herein may be used to determine whether and to what extent to trust an enterprise software system or similar infrastructure and software components. In related embodiments, the system can identify which of the various factors used in generating the security reliance score would have the most impact on the security vulnerability diagnostic score, thus assisting and directing administrators or others evaluate and improve the impact of changes within an enterprise. For example, the method may optionally extend to identifying and recommending a software testing regimen for the software application based at least in part on the security vulnerability diagnostic score as determined for the given software application.

Methodology

FIG. 3 illustrates, in an example embodiment, method 300 of operation of a server computing system 101 for security diagnostic assessment of enterprise software applications, method 300 being performed by one or more processors 201 of server computing device 101. In describing the example of FIG. 3, reference is made to the examples of FIG. 1 and FIG. 2 for purposes of illustrating suitable components or elements for performing a step or sub-step being described.

Examples of method steps described herein relate to the use of server 101 for implementing the techniques described. According to one embodiment, the techniques are performed by software security diagnostic logic module 105 of server 101 in response to the processor 201 executing one or more sequences of software logic instructions that constitute software security diagnostic logic module 105. In embodiments, software security diagnostic logic module 105 may include the one or more sequences of instructions within sub-modules including technical attributes module 210, execution context attributes module 211 and security diagnostic scoring module 212. Such instructions may be read into memory 202 from machine-readable medium, such as memory storage devices. In executing the sequences of instructions contained in technical attributes module 210, execution context attributes module 211 and security diagnostic scoring module 212 of software security diagnostic logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, processor 201 executes instructions of technical attributes module 210 to receive, in memory 202 of security assessing server computing device 101, a set of technical attributes of the software application being evaluated.

In some embodiments, the set of technical attributes comprises modules 210a, 210 and 210c pertaining to: a security history of constituent software development libraries used in developing the software application, a cryptographic attribute, and a system protocol attribute, respectively.

In some examples, the technical attribute security score may be determined based on at least one of: constituent software development libraries used in developing the software application, the cryptographic attribute, and the system protocol attribute. In certain aspects, a higher score may be determined or assigned in instances where the particular attribute contributes to, or indicates, a lower security risk or greater resilience to potential security threats. Likewise, a lower score may be merited where assessment of a given attribute contributes to, or indicates, a higher security risk or lessened resilience to potential software security threats.

The cryptographic attribute 210b, in some embodiments, may pertain to a cryptographic key and a cryptographic certificate used with a cryptographic algorithm that may be inherent to, or accessed and applied, by the software application when deployed for production or normal uses as intended when under execution in a processor of computing device 102.

Particular aspects or attributes of the cryptographic material considered may include public key length, public key algorithm, the validity duration of the cryptographic certificate, the signature algorithm associated with the certificate, the certificate revocation status repository references for authority information access, the configuration of certificate extension attributes such as key usage, extended key usage, the certificate's issuer security vetting process, and the certificate issuer origin, compliance to standards, policies, and best practices, and geographic locations and boundaries among others.

In further embodiments, the security history of constituent software development libraries used in developing the software application, in accordance with module 210a may be based on, and include, security vulnerability data accumulated based on industry-wide deployment of particular constituent modules of the software development libraries.

A notification service deployed at server 101 may be used to retrieve a copy of the software application deployed at computing device 102, or communicatively accessible to computing device 102 via database 103, over cloud-based communication network 104, and determine the software development libraries or components used in development of the software application. Software security diagnostic logic module 105 at server device 101 can then determine security vulnerabilities in the libraries, based on industry-wide accumulated experience in some embodiments, and provide a security assessment or assign a security score based on expected inherent vulnerabilities of the software application.

In some aspects, security performance indicators may me assigned or determined for a given corps of programmers, or even for individual programmers, that develop the software, or contributed in definable ways to development of the software and related systems. Such performance indicators may be assigned or derived at least part based on a cumulative security performance history or records of the corps of programmers and individual programmers. The security performance indicators may be tracked and updated, for example using performance indicator (PKI) measurements of security vulnerability instances including but not limited to expected security infringement instances.

In other aspects, the system protocol attribute in accordance with module 210c pertains to effectiveness of the cryptographic material when used in conjunction with particular operating systems and protocols to account for, and address, any known security vulnerabilities. In certain embodiments, the cryptographic related scoring may be further dynamically adjusted to identify the trustworthiness of a particular system based on applicable system and security protocols implemented, and the usage of the cryptographic material in response to incoming data.

At step 320, processor 201 of server computing device 101 executes instructions included in execution context attributes module 211 to receive a set of execution context attributes of the software application.

In some aspects, the set of execution context attributes comprises at least one of as assessment of customer facing transactions 211a, a quality of service (QoS) operational performance level 211b, and interlocking applications 211c implicated in operational deployment of the software application.

In additional embodiments, the execution context security score may be determined based on an assessment of at least one of: the customer facing transactions, the QoS performance level, and the interlocking applications implicated in operational deployment of the software application.

The nature and extent of customer facing transactions 211a considered may be relate to context in which the application operates. For example, an application that is deployed as "customer-facing" and intended to facilitate high-volume, secure transactions such as banking and ecommerce necessitates more rigorous testing and an enhanced level of security scrutiny to ensure that customer data is not compromised. Conversely, applications such as document-control systems or desktop applications that are implemented entirely within a same enterprise or organization, and operated behind secure firewalls, less stringent security considerations may be applied.

The QoS operational performance level 211b attribute may relate to a required or expected system availability (e.g., 99.99% uptime), expected throughputs or transaction volumes, and the types of users, internal users versus external customers, who will operate and use the software application.

Interlocking applications 211c may pertain to the operating system in which the application executes in relation to other software applications and operating systems with which the application interacts and interoperates during operation for its intended purpose.

At step 330, processor 201 executes instructions included in security diagnostic scoring module 212, to determine a security vulnerability diagnostic score for the software application based at least in part on the set of technical attributes and the set of execution context attributes.

In some embodiments, the security vulnerability diagnostic score comprises a weighted aggregation of a technical attribute security score based on the set of technical attributes and an execution context security score based on the set of execution context attributes.

In embodiments, a higher security vulnerability diagnostic score may be determined or assigned in instances where the particular attribute contributes to, or indicates, a lower security risk or greater resilience to potential security threats. On the other hand, a lower score may be merited where assessment of a given attribute contributes to, or indicates, an increased security risk or a lessened resilience to potential software security threats.

It is contemplated a security vulnerability score or similar security assessment may be applied to, and associated with a particular software provider, or even an enterprise user, based on an expectation of performance in regard to vulnerability or resilience of software or related systems solutions provided or used. Such association or a security designation may be determined or calculated at least in part based on a cumulative history of instances, or infrequency of occurrences, with regard to system vulnerabilities or system resilience associated with solutions used and/or provided by an enterprise entity or individual party. Usage factors implicated in the security assessment may include, but not necessarily limited to, any combination of the execution context attributes as described herein. Security assessment determinations for system providers may consider, but not necessarily limited to, any combination of technical attributes related to developing and deploying the software and system solutions as described herein.

In certain aspects, security vulnerability diagnostic scores as proposed herein may be applied to determine whether and to what extent to trust an enterprise software system or similar infrastructure and software components. In related embodiments, the system can identify which of the various factors used in generating the security reliance score would have the most impact on the security vulnerability diagnostic score, thus assisting and directing administrators or others evaluate and improve the impact of changes within an enterprise. In one particular embodiment, the method further comprises identifying and recommending a software testing regimen for the software application based at least in part on the security vulnerability diagnostic score as determined for the given software application.

It is contemplated that embodiments described herein extend to individual elements and concepts described herein, as well as for embodiments to include combinations of elements recited anywhere in this application. Although embodiments are described in detail herein with reference to the accompanying drawings, it is to be understood that the invention is not limited to only such example embodiments. As such, many modifications and variations will be apparent to practitioners skilled in the art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventors from claiming rights to such combinations.

What is claimed is:

1. A method of selecting a software testing regimen for a software application, the method comprising:
   receiving, at a security assessing server computing device, a Quality of Service (QoS) performance level in conjunction with a set of technical attributes of the software application;
   determining a security vulnerability diagnostic score for the software application based at least in part on the set of technical attributes and the QoS performance level; and
   applying a software testing regimen in testing the software application based at least in part upon identifying an operational uptime QoS performance level that has a maximum effect on the security vulnerability diagnostic score as determined.

2. The method of claim 1 wherein the security vulnerability diagnostic score comprises a weighted aggregation of a technical attribute security score based on the set of technical attributes and an execution context security score based at least in part on the QoS performance level.

3. The method of claim 2 wherein the set of technical attributes comprises at least one of a security history of constituent software development libraries used in development of the software application, a cryptographic security attribute, and a system protocol security attribute.

4. The method of claim 3 wherein the cryptographic security attribute pertains to at least one of a cryptographic key and a cryptographic certificate used with a cryptographic security algorithm.

5. The method of claim 3 wherein the security history of constituent software development libraries used in developing the software application includes an assessment of security vulnerability data based on accumulative industry-wide deployment of the constituent software development libraries.

6. The method of claim 3 wherein the system protocol security attribute pertains to effectiveness of the cryptographic security attribute as an indication of the vulnerability of communication protocols applying cryptographic material to account for known vulnerabilities of the cryptographic material when deployed in particular systems and associated communication protocols.

7. The method of claim 2 wherein the execution context security score is further based on at least one of: an assessment of customer facing transactions, and an assessment of one or more interlocking applications implicated in operational deployment of the software application.

8. The method of claim 2 wherein the technical attribute security score is determined based on at least one of: constituent software development libraries used in developing the software application, a cryptographic security attribute, and a system protocol security attribute.

9. The method of claim 1 wherein the QoS performance level is based at least in part on a measure of an operational uptime in deployment of the software application.

10. A server computing system comprising:
   a processor;
   a non-transitory memory storing a set of instructions, the instructions when executed in the processor causing the processor to implement operations comprising:
      receiving, at a security assessing server computing device, a Quality of Service (QoS) performance level in conjunction with a set of technical attributes of a software application;
      determining a security vulnerability diagnostic score for the software application based at least in part on the set of technical attributes and the QoS performance level; and
      applying a software testing regimen in testing the software application based at least in part upon identifying an operational uptime QoS performance level that has a maximum effect on the security vulnerability diagnostic score as determined.

11. The server computing system of claim 10 wherein the security vulnerability diagnostic score comprises a weighted aggregation of a technical attribute security score based on the set of technical attributes and an execution context security score based at least in part on the QoS performance level.

12. The server computing system of claim 11 wherein the set of technical attributes comprises at least one of a security history of constituent software development libraries used in development of the software application, a cryptographic security attribute, and a system protocol security attribute.

13. The server computing system of claim 12 wherein the cryptographic security attribute pertains to at least one of a cryptographic key and a cryptographic certificate used with a cryptographic security algorithm.

14. The server computing system of claim 12 wherein the security history of constituent software development libraries used in developing the software application includes an assessment of security vulnerability data based on accumulative industry-wide deployment of the constituent software development libraries.

15. The server computing system of claim 12 wherein the system protocol security attribute pertains to effectiveness of the cryptographic security attribute as an indication of the vulnerability of communication protocols applying cryptographic material to account for known vulnerabilities of the cryptographic material when deployed in particular systems and associated communication protocols.

16. The server computing system of claim 11 wherein the execution context security score is further based on at least one of: an assessment of customer facing transactions, and an assessment of one or more interlocking applications implicated in operational deployment of the software application.

17. The server computing system of claim 11 wherein the technical attribute security score is determined based on at least one of: constituent software development libraries used in developing the software application, a cryptographic security attribute, and a system protocol security attribute.

18. The server computing system of claim 10 wherein the QoS performance level is based at least in part on a measure of an operational uptime in deployment of the software application.

19. A non-transitory memory storing instructions, the instructions when executed in one or more processors causing the one or more processors to implement operations comprising:
  receiving, at a security assessing server computing device, a Quality of Service (QoS) performance level in conjunction with a set of technical attributes of a software application;
  determining a security vulnerability diagnostic score for the software application based at least in part on the set of technical attributes and the QoS performance level; and
  applying a software testing regimen in testing the software application based at least in part upon identifying an operational uptime QoS performance level that has a maximum effect on the security vulnerability diagnostic score as determined.

* * * * *